April 12, 1932.  A. B. BELL  1,853,844
RECLINING SEAT
Filed Aug. 12, 1929   3 Sheets-Sheet 1
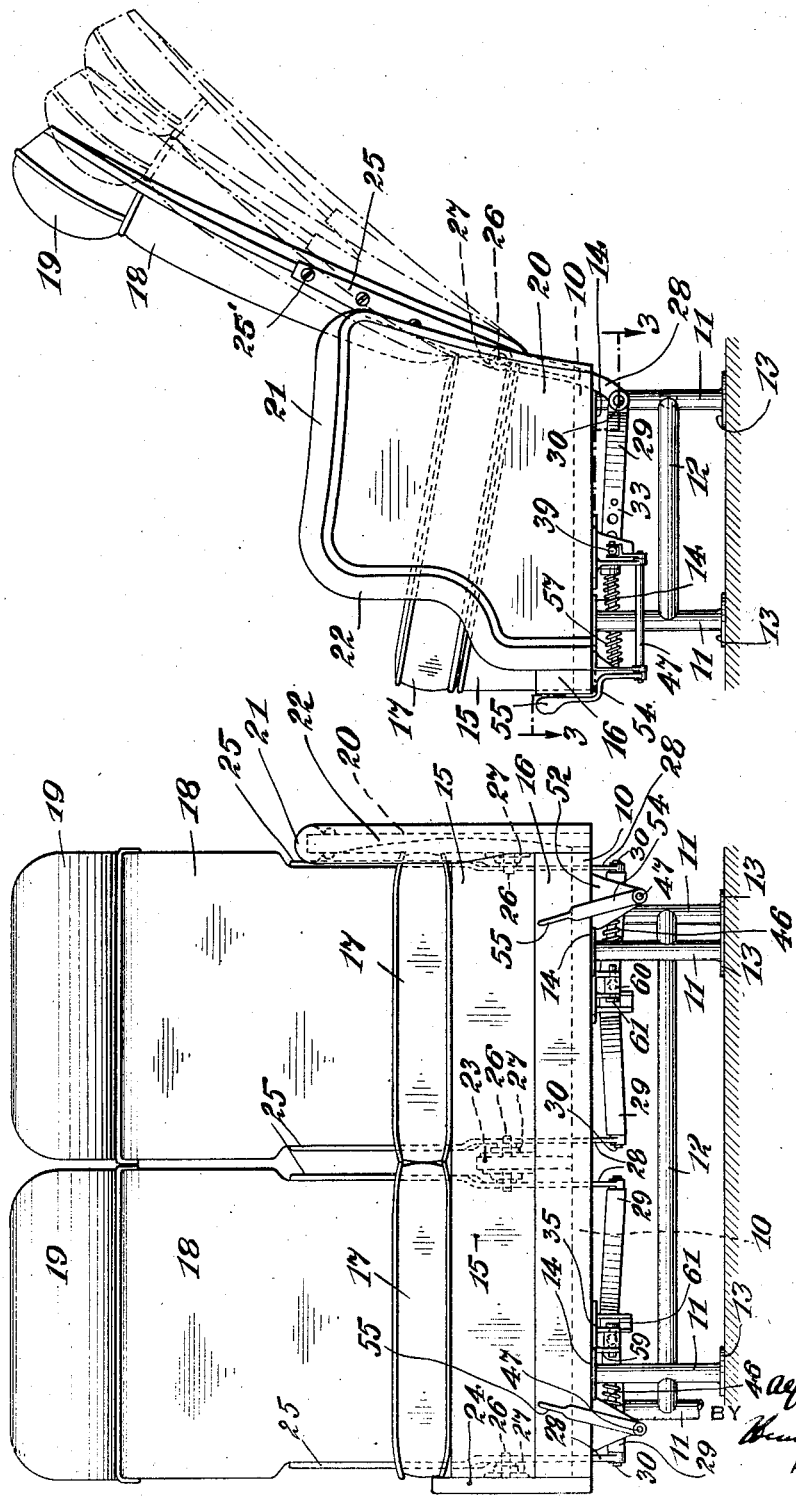

April 12, 1932.    A. B. BELL    1,853,844
RECLINING SEAT
Filed Aug. 12, 1929    3 Sheets-Sheet 2

INVENTOR
Alfred B. Bell
BY
Henry Van Arsdel
ATTORNEY

April 12, 1932.  A. B. BELL  1,853,844
RECLINING SEAT
Filed Aug. 12, 1929  3 Sheets-Sheet 3
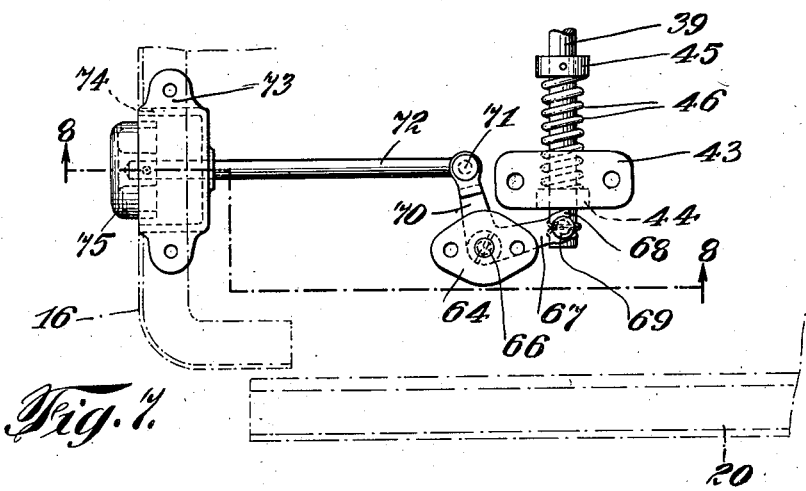
Fig. 7.
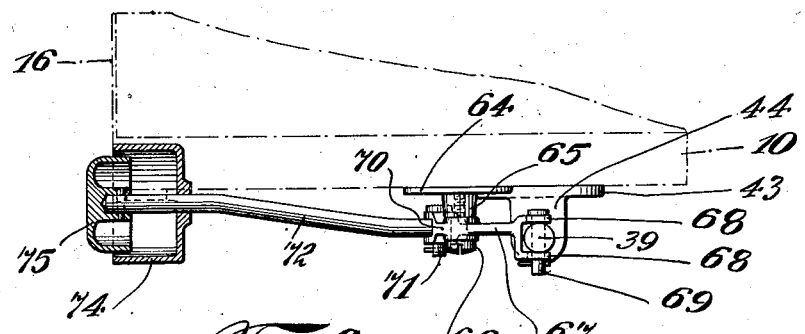
Fig. 8.
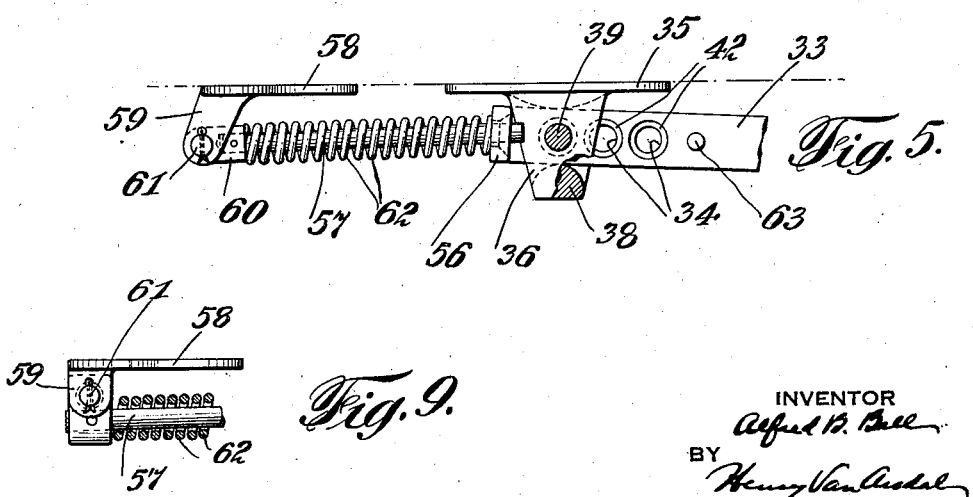
Fig. 5.
Fig. 9.
INVENTOR
Alfred B. Bell
BY
Henry Van Arsdale
ATTORNEY Patented Apr. 12, 1932

1,853,844

UNITED STATES PATENT OFFICE

ALFRED B. BELL, OF PHILADELPHIA, PENNSYLVANIA, ASSIGNOR TO HALE & KILBURN CO., OF PHILADELPHIA, PENNSYLVANIA, A CORPORATION OF DELAWARE

RECLINING SEAT

Application filed August 12, 1929. Serial No. 385,111.

This invention relates to reclining seats, and more particularly to seats for use in railway coaches, busses and tramcars, having a back rest adapted to be adjustably reclined.

To make busses and railway transportation attractive to the public requires that the seats be made as comfortable and convenient as possible. In long distance transportation, the passenger becomes weary if required to sit in a certain definite position throughout the length of the journey. A vehicle seat can be made very much more comfortable and restful if the back rest can be variously reclined in a variety of positions, as the passenger desires, so that he is not compelled to sit in one fixed position throughout the journey. To further increase the comfort of the passenger, the operative element for reclining the back rest should be conveniently located and easily manipulated, so that the back rest can be reclined in a variety of positions with the least effort on the part of the passenger, and can be quickly and conveniently restored to upright position by the passenger or trainman.

The provision of seats having backs which may be adjusted to different inclinations is not broadly novel. However, reclining seats have been used to a very small extent for passenger transportation, for instance, in railway or tramcars or automotive busses because of various objectionable features. For instance, it is of utmost advantage, especially in interurban service, to provide as many seats as possible in each car or bus. Heretofore reclining seats have required a large amount of space and have not been suitable for such use on account of the consequent reduction in the seating accommodations of the car or bus. Further, the reclining mechanism heretofore used occupied considerable space under the seat, rendering it difficult to clean under the seat. Reclining devices heretofore used have also been heavy, cumbersome, and difficult to operate. A further objection has been that much of the reclining mechanism is exposed and often interferes with passengers entering or leaving the seats.

Accordingly, a principal object of this invention is to provide a reclining seat which is free of the objections noted above, and, therefore, especially well suited for use in railway or tramcars or in automotive busses.

A further object of this invention is to provide a seat having a hinged back rest adapted to be adjustably reclined in a variety of reclining positions, in a simple and convenient manner requiring a minimum of effort, and provided with means for adjustably retaining the back rest in any one of a number of inclined positions.

Another object of this invention is to provide reclining mechanism for reclining seats, which is simple and light in construction, which is easy to manipulate, and which is strong and lasting in service, and will withstand great abuse without getting out of order.

Other objects of this invention will become evident as the disclosure proceeds.

In accordance with my invention, the seat back is hinged at its lower edge to a suitable support. The reclining mechanism may include a rack member pivotally secured to the lower edge of the back rest below the hinge, and extending underneath the seat cushion or seating portion of the seat. Mechanism, positioned under the seat cushion or beneath the seating portion of the seat, is engageable with the rack member at different points to give the desired adjusted inclination to the seat back, this mechanism being readily disengageable from the rack members by the passenger or by trainmen to permit the inclination of the seat back to be altered. Means are also preferably provided which act to return the seat back to upright position when released, these means being also positioned beneath the seat cushion or seating portion of the seat.

In order that a clearer understanding of my invention may be had, attention is hereby directed to the accompanying drawings, forming a part of this application and illustrating certain possible embodiments of my invention.

Referring to the drawings, Figure 1 is a front elevational view of a double vehicle seat having my novel reclining mechanism associated with a hinged back rest;

Figure 2 is an end view of my seat showing the reclining mechanism operatively connected to the hinged back rest, dotted lines being used to indicate various inclined positions which the back rest may assume;

Figure 5 is an enlarged fragmentary cross-sectional view of another portion of my reclining mechanism, taken on line 5—5 of Figure 3;

Figure 7 is a fragmentary top view of a modified construction of my reclining mechanism, showing more particularly a modified manipulating element;

Figure 8 is a sectional view of the same, and is taken on the line 8—8 of Figure 7, and Figure 9 is an enlarged fragmentary view of a slightly modified construction of my reclining mechanism.

Similar reference characters refer to similar parts throughout the several views of the drawings.

Figure 3:
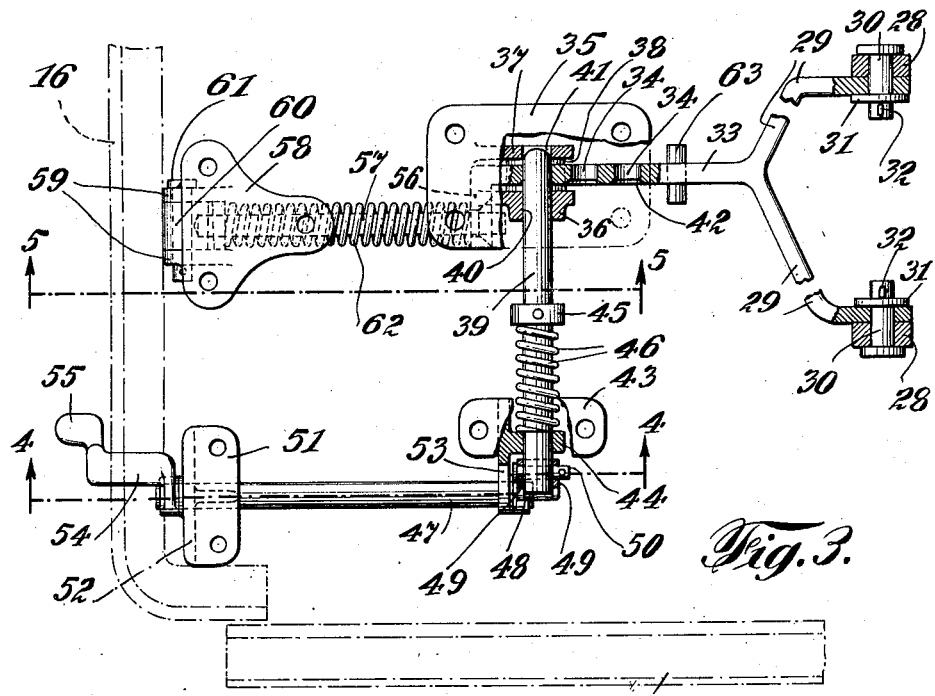
Figure 3 is an enlarged top view of my novel reclining mechanism, certain parts being broken away to more clearly show the construction, the view being taken on line 3—3 of Figure 2.

Referring to the drawings, I have shown my back reclining mechanism associated with a double vehicle seat having a pair of individual seat cushions and a pair of individual reclining back rests. It will be understood, however, that I contemplate using my seat back tilting mechanism with any type of seat and do not limit myself to double seats, or seats for vehicle use. For purposes of illustration only therefore, I show a double seat having a seat frame 10 supported on any suitable pedestal. I have shown for purposes of illustration only a supporting pedestal comprising corner posts 11 connected together in a solid manner by means of horizontal rails 12. The lower end of each post may be provided with a foot portion 13 through which any suitable securing means (not shown) may extend to fixedly secure the seat to the floor. The top of each post may be similarly provided with a cap portion 14 forming a supporting surface for the seat frame 10. A spring assembly 15 may be supported on the frame 10. A face plate 16 extending across the front of the supporting frame and around the front corners thereof may be provided to retain the spring assembly 15 in proper position. Individual seat cushions 17 may be supported directly on the spring assembly 15. The top of each spring assembly may be inclined rearwardly, as shown in Figure 2, to give a comfortable inclination to the seat cushions supported thereon.

The back rest portion of the seat may be of any suitable construction. To insure the greatest possible seating comfort, however, I preferably construct my back rest portion so as to present a comfortably cushioned body supporting section 18, and a head rest section 19, each section being shaped so as to respectively conform to the body and head of the passenger.

The back rest portions are pivotally mounted on suitable supports extending upwardly from the frame 10 of the seat. Arm rest 20 of the seat may comprise one of these supporting members. The arm rest 20 is firmly secured in any suitable manner to the frame 10. The top edge periphery 21 and the front edge periphery 22 may be suitably shaped so as to present a comfortable supporting surface for the arm of the passenger. An intermediate supporting member 23 shown in dotted lines in Figure 1, and positioned midway between the seat ends, is secured in an upright manner to the seat frame 10. Intermediate supporting member 23 supports the adjacent inner edges of the back rest portions in a manner presently to be described. The wall side edge of the inner back rest portion 18 may also be supported by means of a suitable upright supporting member 24 firmly fixed to the seat frame 10.

An elongated bar member 25 is suitably secured, as by means of screws 25', to each side edge of the respective back rest portions. A stud element 26 projects laterally from the respective supporting members 20, 23 and 24 above described to pivotally support the back rest portions. Each stud element may be provided with a base portion 27 through which suitable securing elements may extend to firmly fix the stud in proper position on its supporting member. As shown in Figure 1, a pair of stud elements are provided for each back rest portion, each stud element extending through a journal aperture in the corresponding bar member 25, thus pivotally supporting the back rest portion to permit the same to swing forward and backward.

As shown in Figure 1, a pair of bar members 25 are provided for each back rest portion, one being disposed at each side edge of the same. Each bar member is provided with a downwardly projecting extension 28 that extends below the pivot point of the back rest portion, as clearly shown in Figure 2.

Figure 4:
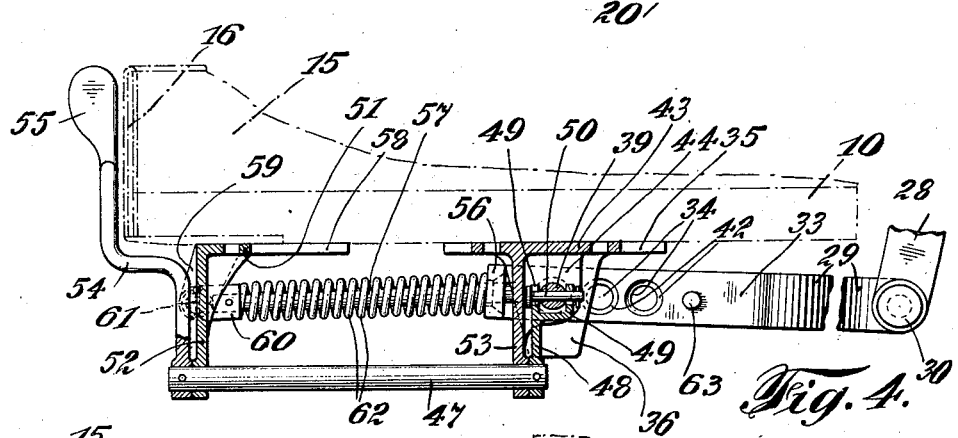
Figure 4 is an enlarged fragmentary cross-sectional view of a portion of my reclining mechanism, the view being taken on line 4—4 of Figure 3.
Figure 6:
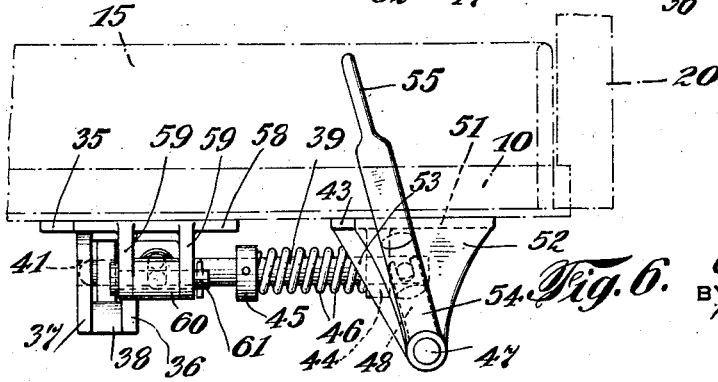
Figure 6 is a front view of my reclining mechanism, a portion of the seat cushion structure being shown in dotted lines.

My reclining mechanism is operatively connected to the free end of each pair of projecting extensions 28 of the bar members. Referring more particularly to Figures 3 and 4, I provide a rack member Y-shaped in general outline. The free end of each arm portion 29 of the Y-shaped rack member is pivotally connected to the lower end of one of the downwardly projecting extensions 28 of bar member by means of a pivot bolt 30 fixedly secured in position by any suitable means such as a washer 31 and a cotter pin 32 extending through the bolt. The stem portion 33 of the Y-shaped rack member is provided with a plurality of spaced apertures 34 with which the locking mechanism is adapted to selectively engage.

The stem member is supported in proper position by means of a suitable guide block. The guide block generally comprises a base portion 35, and a pair of spaced downwardly extending guide portions 36 and 37. The stem portion of the rack member rests upon a rounded support 38 connecting the lower ends of the spaced guide portions 36 and 37. Suitable securing elements (not shown) may extend through the base portion 35 of the guide block and into the seat frame 10, firmly securing the guide block in position. The lower edge of the stem portion of the rack member slides over on the rounded supporting portion of the guide block.

A lock bolt 39 is provided which is adapted to selectively engage with the spaced apertures 34 provided in the stem portion 33 of the rack member. The lock bolt is preferably positioned at right angles to the stem portion 33 of the rack member, and is adapted to slide within alined apertures 40 and 41 in the respective guide portions 36 and 37 of the guide block. The locking end of the lock bolt may be rounded so as to more easily direct itself into the spaced apertures provided in the stem portion of the rack member. The spaced apertures in the stem portion of the rack member may also be reamed, as at 42, to facilitate the entrance of the locking end of the lock bolt into the respective apertures. The locking end of the lock bolt is not completely withdrawn from the aperture 40 in guide portion 36, when the lock bolt is retracted. Guide portion 36 thus forms a permanent support for the locking end of the lock bolt, and is therefore considerably thicker than the guide portion 37, as clearly shown in Figure 3. The other end of the lock bolt is supported in position by means of a guide block comprising a base portion 43 and a downwardly extending guide portion 44. The lock bolt extends through an aperture provided in the guide portion 44, and is free to reciprocate therein.

A collar member 45 is secured to the lock bolt, as shown in Figure 3. An expansible coil spring 46 surrounds the lock bolt and is positioned between the collar 45 and the guide portion 44 of the supporting block. Expansion spring 45 operates to normally shoot the lock bolt forwardly through the selected aperture in the stem portion 33 of the rack member, and aperture 41 in guide portion 37.

Means are provided for manually retracting the lock bolt out of engagement with the stem portion of the rack member. An operating rod 47 extending from the lock bolt to the front edge of the seat is provided with a rocking element 48 fixed to the inner end thereof. The rocking element is provided with a forked portion comprising a pair of arms 49 spaced apart, as shown in Figure 4. The end of the lock bolt extends between the arms of the forked portion and is pivotally connected thereto by means of a suitable bolt 50 extending through the lock bolt 39 and the two arms 49 of the forked portion. The operating rod 47 is supported at the outer end thereof by means of a bracket having an attaching portion 51 and a downwardly extending flanged portion 52. The front end of the operating rod is journalled in a suitable journal aperture in the flanged portion 52. The inner end of the operating rod extends through a journal aperture provided in a flanged extension 53 projecting from the guide portion 48, as clearly shown in Figures 3 and 4. Now it is seen that by rotating the operating rod 47 in a clockwise direction, the lock bolt 39 can be moved out of engagement with the stem portion 33 of the rack member.

To facilitate rotation of the operating rod, I provide a manipulating element positioned at the front edge of the seat. This manipulating element may comprise an operating lever 54, as shown in Figures 4 and 5. The operating lever is fixed at its lower end to the operating rod in any suitable manner, and may be provided with a handle portion 55 to facilitate manipulation of the lever. It is now seen that the manipulating lever 54, the operating rod 47, the rocking member 48, and the lock bolt 39 are all operatively connected, so that when the manipulating lever is swung towards the right, the locking bolt is moved out of engagement with the rack member against the action of expansible coil spring 46. The back rest portion can then be adjusted to any reclining position desired. As soon as the manipulating lever is released, the coil spring 46 will swing the lever back to normal at rest position and project the end of the latch bolt into the stem portion of the rack member.

Driving means are provided for swinging the back rest portion forwardly when the lock bolt is disengaged from the stem portion of the rack member and/or body pressure is removed from the back rest portion. To this end I provide a wall portion 56 projecting laterally from the free end of the stem portion 33 of the rack member. An aperture is provided in the wall portion 56 through which a guide rod 57 is free to slide. The guide rod is supported in position by means of a bracket comprising a base portion 58 and a pair of downwardly extending spaced lug portions 59. Suitable securing means (not shown) extending through the base portion of the bracket into the seat frame 10 may be used to secure the bracket in position. A knuckle member 60 is pivotally connected to the lug portions 59 by means of a pivot bolt 61. The outer end of the guide rod 57 is fixedly secured to the knuckle bolt. An expansible coil spring 62 surrounding the guide rod and positioned between the wall portion 56 and the knuckle member 60 operates to exert pressure on the wall portion 56 connected to the rack member. The knuckle member 60 may be of the form shown in Figure 5 with the expanding pressure of coil spring 62 exerted directly against the pivot bolt 61, or of the form shown in Figure 9 with the expanding pressure from coil spring 62 exerted to one side of the pivot bolt 61. The pressure exerted by the coil spring 62 tends to push the rack member rearwardly and swing the back rest portion of the seat forwardly. It is thus seen that immediately upon withdrawal of the lock bolt from the stem portion of the rack member and the release of pressure against the back rest portion, coil spring 62 will operate to swing the back rest portion forwardly to a more nearly vertical position. To limit the forward swinging movement of the back rest portion, I provide a stop pin 63 which extends through the stem portion of the rack member and is adapted to abut against lug portions 36 and 37 when the back rest portion is swung forward a predetermined amount.

As a modified construction, I have shown in Figures 7 and 8 a different arrangement for manipulating the lock bolt. In this construction I provide a bracket having a base portion 64 and a downwardly extending stud portion 65. A bell crank lever is pivotally mounted on the stud portion, and secured in place by means of a screw 66. The outer end of arm 67 of the bell crank lever is forked so as to provide a pair of spaced fingers 68. The lock bolt 39 extends between the spaced fingers 68 and is pivotally connected thereto by means of a pivot bolt 69, which extends through the end of the lock bolt and seats within a recess cut in the end of each finger portion 68. The other arm 70 of the bell crank lever is pivotally connected as by means of a pivot bolt 71 to an operating rod 72. The operating rod 72 extends as before from the vicinity of the lock bolt to the front edge of the seat. A bracket member having an attaching portion 73 and a cup shaped body portion 74 is positioned at a convenient point along the front edge of the seat. The outer end of the operating rod 72 extends through an aperture in the body portion 74 of the bracket. A manipulating head 75 telescoping within the cup shaped body portion 74 of the bracket is secured to the outer end of the operating rod. It is now seen that by exerting pressure on the manipulating head the bell crank lever can be rocked to withdraw the locking bolt out of engagement with the stem portion of the rack member.

It is now seen that I have provided a seat especially adapted for public conveyances, which occupies comparatively little space, and which yields the maximum comfort to the passenger. The seat cushion is inclined at a comfortable angle and the back rest can be positioned in a variety of inclined positions. The occupant of the seat is, therefore, not forced to maintain a certain sitting position on long journeys, but may variously recline himself on the seat to maintain maximum comfort. The reclining mechanism comprises few parts and is so attached to the underside of the seat frame 10 as to occupy very little space. The operating mechanism is out of the way and offers no obstruction to the cleaning of the floor under the seat. Should it be desirable to protect the operative elements of the reclining mechanism from dust and tampering passengers, the whole is so compactly assembled as to permit the parts to be protected within a suitable cover (not shown) if such is found desirable. The manipulating lever or push button by means of which the occupant tilts the back rest is conveniently arranged along the front edge of the seat so that the passenger is able to tilt the back rest scarcely without effort. The tilting mechanism is made of few parts, sturdily constructed and easy to assemble.

As many changes could be made in the above construction and as many apparently widely different embodiments of this invention could be made without departing from the scope thereof, it is intended that all matter contained in the above description or shown in the accompanying drawings shall be interpreted as illustrative and not in a limiting sense.

What I claim is:—

1. In a chair of the character described, in combination, supporting structure, a seat back pivotally mounted thereon and having a depending extension, a rack bar support and guide member mounted on the supporting structure, a rack bar pivotally anchored at one end to the back extension and at the other end slidably supported and guided by said guide member and provided with an abutment having an aperture, a guide rod pivotally anchored at one end to the supporting structure and having its other end slidably penetrating said abutment aperture, a manually operable device adapted to be releasably engaged with said rack bar to hold the seat back in adjusted position of inclination, and means including a coil spring encircling said guide rod and pressing against said rack bar abutment, to restore the seat back, when released, to elevated position.

2. In a chair of the character described, in combination. supporting structure, a seat back pivotally mounted thereon and having a depending extension, a rack bar support and guide member mounted on the supporting structure, a rack bar pivotally anchored at one end to the back extension and at the other end slidably supported and guided by said guide member and provided with an abutment having an aperture, a guide rod pivotally anchored at one end to the supporting structure and having its other end slidably penetrating said abutment aperture, a manually operable device adapted to be releasably engaged with said rack bar to hold the seat back in adjusted position of inclination, and means including a coil spring encircling said guide rod and pressing against said rack bar abutment, to restore the seat back, when released, to elevated position, said latch device including a latch pin having its rack bar engaging end slidably retained and guided in the rack bar support and guide member.

3. In a seat having a frame and a seat back adjustably supported thereon, in combination, a rack member secured to the seat back, a guide member therefor secured to the seat frame, a compression spring supporting member having one end swingingly connected to the seat frame and the other end swingingly connected to the rack member, a compression spring carried by said supporting member, an abutment on said supporting member for one end of the spring and an abutment on the rack bar for the other end of the spring, said spring being compressed between said abutments whereby said spring normally tends to force the rack member rearwardly to elevate the seat back, and releasable detent means for holding the seat back in adjusted position.

4. In a seat having a frame and a seat back adjustably supported thereon, in combination, a rack member movably supported by the frame and connected to the seat back, detent means for retaining the rack member and seat back in adjusted position, a compression spring supporting member, a compression spring supported thereby, said rack member having an abutment engaging one end of said spring and swingingly supporting one end of the spring supporting member, the other end of said spring supporting member being swingingly secured to the seat frame and having an abutment engaging the other end of said spring, the spring being compressed between said abutments whereby said spring normally tends to force the rack member rearwardly to elevate the seat back.

This specification signed this 25th day of July, 1929.

ALFRED B. BELL.